(No Model.)
H. E. STURCKE.
PROCESS OF PREPARING AMORPHOUS CARBONATE OF LIME FROM RESIDUES.
No. 603,226. Patented Apr. 26, 1898.
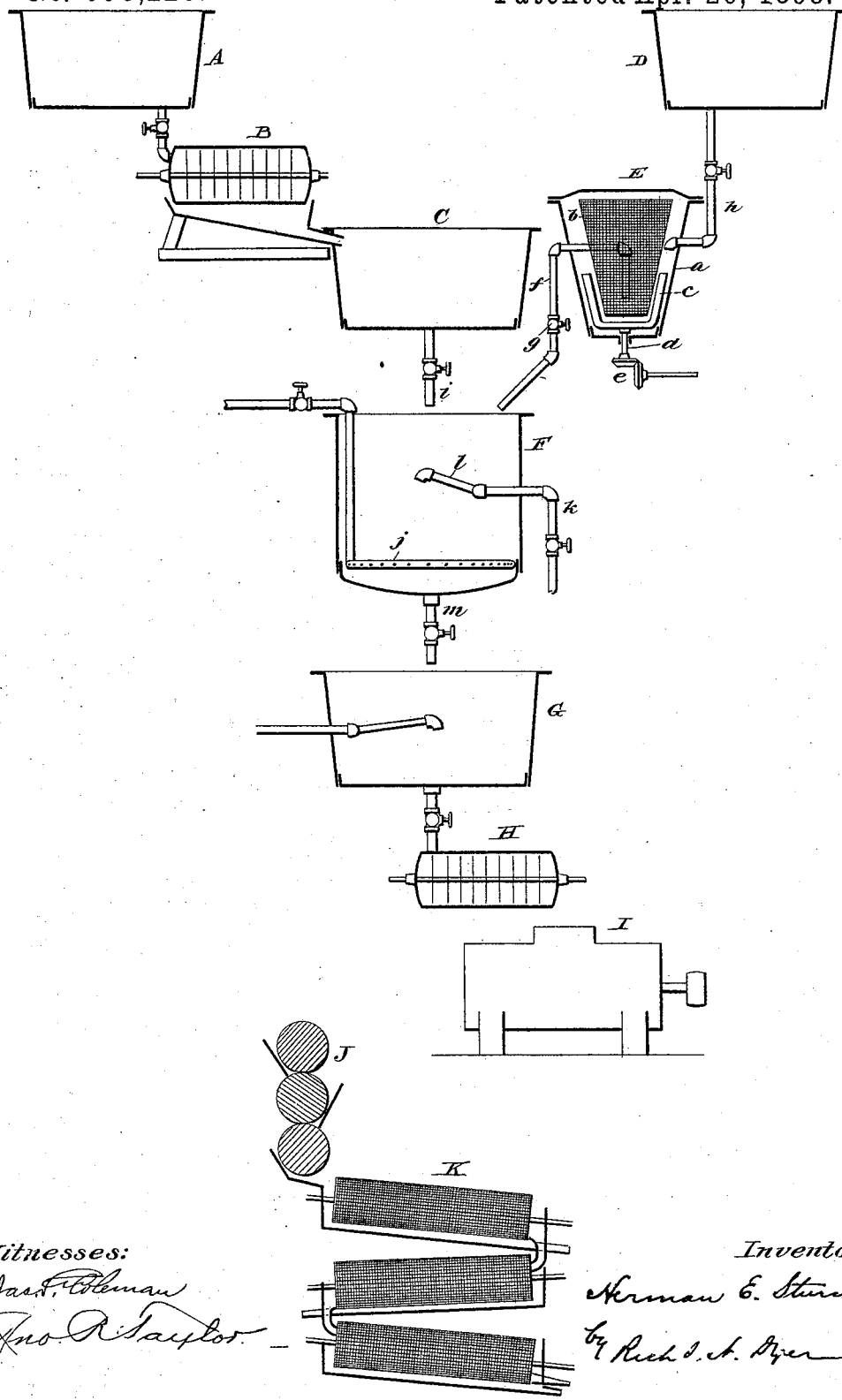
Witnesses:
Inventor
Herman E. Sturcke

UNITED STATES PATENT OFFICE.

HERMAN E. STURCKE, OF JAMAICA, NEW YORK, ASSIGNOR TO THE ÆTNA CHEMICAL COMPANY, OF NEW YORK, N. Y.

PROCESS OF PREPARING AMORPHOUS CARBONATE OF LIME FROM RESIDUES.

SPECIFICATION forming part of Letters Patent No. 603,226, dated April 26, 1898.

Application filed December 16, 1897. Serial No. 662,166. (No specimens.)

*To all whom it may concern:*

Be it known that I, HERMAN E. STURCKE, a citizen of the United States, residing at Jamaica, in the county of Queens and State of New York, have invented a certain new and useful Improvement in Processes of Preparing Amorphous Carbonate of Lime from Residues, of which the following is a specification.

My invention relates to an improved process of obtaining from residues an amorphous carbonate of lime of extremely fine division which will be equal in many respects to the so-called "precipitated chalk" or calcium carbonate now obtained by subjecting a solution of a soluble calcium salt, such as chlorid of calcium, to the action of a solution of a soluble alkali carbonate, such as carbonate of soda. While the amorphous carbonate of lime obtained by my improved process is in many respects equal to precipitated chalk, it is produced at a very much decreased cost.

Broadly stated, the invention consists in subjecting the carbonate of lime obtained as a precipitate in the treatment of calcium oxid with a solution of an alkali carbonate to a mechanical separating action in dry form and by which the greater part of the impurities with which such carbonate of lime may be contaminated will be removed. I find that this dry mechanical separation may be carried out in a suitable bolting apparatus, since the carbonate-of-lime particles obtained as a precipitate, as explained, are measurably finer than any insoluble impurity which may be present.

In carrying out my invention I mix the calcium oxid, whether the same is employed as quicklime or in the hydrated form as slacked lime, with the alkali-carbonate solution and allow the materials to act upon each other under proper conditions. I then separate the products, the solution of caustic lime obtained and the precipitated calcium carbonate, which latter is to be subjected to the special treatment. This precipitate may be first passed through a filter-press to remove the soluble impurities, or without such treatment it may be immediately removed to a suitable drying apparatus, by which the moisture contained in the same may be driven off. The dry product, whether that obtained as the precipitate in the first instance or the filter-cake, is then reduced to the form of a fine powder, such as by being passed through grinding-rolls. This powder is then passed through a mechanical separating apparatus, such as an ordinary bolting-mill, and in this way the fine particles of calcium carbonate will be separated from the coarser particles of impurities, which are rejected as tailings. If desired, the raw materials may be properly purified before they are brought together in the converting-tank, although this preliminary purification is not strictly necessary in the present invention. When such purification is desired, however, it may be effected by clarifying the alkali-carbonate solution by careful filtration with or without the previous addition of some clarifying materials, as clay or alum solutions or calcium-salts solutions, and by converting the caustic lime into a thin milk of lime, in which condition the lime is reduced to extremely-fine particles, which by screening, floating, or jigging can readily be separated from all accidental impurities, thus obtaining the caustic lime in a purified condition. Instead of screening the caustic lime in the form of milk of lime the lime can also be purified by slacking the lime with sufficient water only to reduce it to a fine dry powder, which is then screened and bolted to remove foreign coarser particles; or, instead, the lime, as quicklime, may be mechanically powdered, screened, and bolted. If the alkali carbonate and the lime are relatively pure, they may be mixed by throwing the alkali carbonate into water and by then slacking the quicklime in this alkali-carbonate solution or the alkali carbonate may be dissolved in the thin milk of lime obtained by slacking the quicklime in an excess of water.

In whatever manner the mixture may be made I prefer that it shall consist of one hundred to one hundred and twenty parts of water, ten parts of carbonate of potash, and four to five parts of caustic lime, or of eighty to one hundred parts of water, ten parts of carbonate of soda, and six to seven parts of caustic lime. While these proportions may be greatly varied without materially changing the results, I prefer to follow the same, as resulting in a quick and fairly complete reaction when the temperature of the mixture is raised by steam or otherwise. The reaction results in a solution of caustic soda or caustic potash, with a small amount of caustic lime in solution and an insoluble sediment of calcium carbonate or carbonate of lime containing an excess of caustic hydrated lime and other impurities. The solution is separated from the calcium carbonate by decantation or filtration. The calcium carbonate is washed to remove, as far as practicable, the caustic alkali. The remaining calcium carbonate may still contain an excess of caustic lime and soluble and insoluble impurities, which must be removed. The caustic lime and soluble impurities may be removed by washing with an excess of water, or the caustic lime may be converted into carbonate of lime by an additional treatment with a new quantity of alkali carbonate or by treating with carbonic acid in aqueous solution or in gas form, or it may be converted into a more or less soluble solution of lime salt by treatment with a suitable acid, such as muriatic acid, sulfurous acid, or sulfuric acid. Whatever the treatment may be to convert or remove the caustic lime contained in the lime carbonate, the treatment is preferably applied to the lime carbonate suspended in an excess of water. This thin milk of carbonate of lime, which consists of extremely-fine amorphous particles of carbonate of lime, of soluble impurities, and of insoluble impurities, is first preferably passed through a filter-press, so as to separate the soluble impurities. Afterward the filter-cake is dried in a suitable drier and is then subjected to a mechanical separating action to remove the insoluble impurities from the carbonate of lime. I find that the particles of carbonate of lime are extremely fine and are practically amorphous, being perceptibly distinguishable from any insoluble impurities with which the calcium carbonate may be contaminated. It therefore becomes possible to mechanically separate the insoluble impurities by a bolting operation, and I therefore subject the dry product to a grinding effect, by which it will be reduced to the form of a fine powder, and such powder is passed through a bolting apparatus, by which the fine amorphous particles of carbonate of lime will be effectively separated from the coarser insoluble materials.

The purified amorphous carbonate of lime obtained from the bolting apparatus or other dry mechanical separating apparatus may be sold in the powdered form in place of precipitated chalk or in the place of whiting, or such powder may be subjected to pressure and converted into bricks or other forms, or it may be mixed with water and sold as a paste, or it may be mixed with water and in its fluid form utilized to form the basis of other pure lime salts, such as sulfate of lime and others, by treating such fluid with a suitable acid.

In order that my improved process may be understood, I illustrate diagrammatically in the accompanying drawing a suitable apparatus by which it may be carried out. In this drawing I show devices for subjecting the raw materials to a preliminary purification, as is preferable in some instances; but it will be understood that such preliminary purification of the raw materials may be dispensed with, particularly when raw materials in reasonably pure condition can be obtained.

A represents a tank in which a solution of alkali carbonate is contained. Connected with this tank is a filter-press B or other filtering device, by which the solution may be clarified. C is a tank for receiving from said filter-press the filtered solution.

D represents a tank or other storage device for containing the thin milk of caustic or crude lime and which, if the same is not sufficiently pure, is passed through a separating device E, by means of which the very fine lime particles are separated from the heavier and coarser impurities. The particular form of separating device shown comprises a receiving tank or vessel $a$, having a very fine screen $b$ therein depending from the cover or top downward in the form of a truncated cone. Working on the outside of this screen are a plurality of stirring-arms $c$, driven from a shaft $d$ through the beveled gears $e$. Extending from a point within the screen $b$ is a siphon $f$, provided with a valve $g$ therein. Instead of said siphon a suction-pipe may be employed. The tank D connects with the interior of the vessel E outside of the screen $b$ by a valved pipe $h$. The siphon $f$ and a valved exit-pipe $i$ from the tank C lead to a reaction-tank F. When the preliminary purification of the raw materials is not carried out in connection with the invention, the elements above referred to, with the exception of the reaction-tank, may be dispensed with and the raw materials directly introduced into said tank without any preliminary treatment. The tank F is preferably provided with a steam-coil $j$, by which the contents of the reaction-tank can be heated to the desired temperature. In order to draw off the clear caustic-alkali solution, I employ a draw-off pipe $k$, having a pivoted inner end $l$, by means of which the liquid may be drawn off at different levels, as will be understood. The calcium-carbonate precipitate formed by the reaction in the tank F is removed through a valved pipe $m$ and passes into a mixing-tank G, in which tank the carbonate of lime from the reaction-tank F is mixed with a sufficient amount of water to form a very thin milk of carbonate of lime. In this tank the milk of lime may be treated with a small amount of carbonic acid or muriatic acid, sulfurous acid, or sulfuric acid to convert the possibly present caustic lime into carbonate or to make the caustic lime and other impurities more soluble. From the tank G the milk of carbonate of lime is passed through a suitable filter-press H, by which the soluble impurities will be removed. The filter-cake from this press is removed therefrom after filtration and is dried in a suitable drier I, after which the dry carbonate of lime, together with any coarser impurities, is removed from said drier and reduced to powdered form. This grinding of the dry material may be effected by a suitable set of grinding-rolls J, arranged in any suitable way and by means of which the products will be reduced to a fine powder. From the grinding-mill or other device the ground materials are passed through suitable bolting apparatus K, by means of which the fine amorphous particles of carbonate of lime will be separated from the coarser insoluble impurities, which pass out of the bolting apparatus in the form of tailings.

The bolting apparatus illustrated comprises three inclined screens arranged in the well-known manner; but it will be understood that any other apparatus for the purpose may be employed. When such screens are used, they will be of very fine mesh, so as to allow for the passage through the same of the amorphous particles of carbonate of lime, but rejecting the heavier and coarser impurities.

In carrying out my improved process in an apparatus such as I have described I proceed substantially as follows: The solution of alkali carbonate in the tank A is passed into the filter-press B and is thereby clarified, the pure solution flowing into the tank C, in which it will be stored for use. The crude milk of caustic lime contained in the tank D is allowed to flow into the mechanical separator E, the stirring-arms $c$ keeping the liquid in agitation and the siphon $f$ drawing off the liquid and the finer particles of lime, which pass through the mesh of the screen $b$. The heavier impurities will be rejected by this screen and may be removed from the separator E in any suitable way. From the siphon $f$ the purified crude milk of lime passes into the reaction-tank F, and when a sufficient amount thereof has accumulated in said tank the valve $g$ is closed. The proper proportion of the clarified alkali-carbonate solution in the tank C is now allowed to enter the reaction-tank, and the mixture is heated by the steam-coil $j$. When the preliminary purification of the raw materials is not necessary, the operations above described are dispensed with.

I prefer that the mixture accumulated in the reaction-tank shall consist of from one hundred to one hundred and twenty parts of water, ten parts of carbonate of potash, and four to five parts of caustic lime or of eighty to one hundred parts of water, ten parts of carbonate of soda, and six to seven parts of caustic lime. It will be understood, however, that these proportions may be greatly varied without materially changing the results, and hence without departing from the essential spirit of my invention. The proportions given, however, result in a quick and fairly complete reaction under the increase of temperature. The reaction in the tank F results in the formation of a solution of caustic soda or caustic potash containing a small amount of caustic lime and an insoluble sediment of calcium carbonate containing some hydrated lime. The caustic-soda or caustic-potash solution is drawn off from the reaction-tank through the pipe $k$ and is used for any purpose desired. The insoluble sediment consists, as stated, of carbonate of lime, which will be in a comparatively pure state if the crude materials have been subjected to the purifying operations referred to. In some cases, therefore, and particularly when relatively pure raw materials in the first instance have been used, the carbonate of lime from the reaction-tank F may be passed directly to the drier and after being dried subjected to the subsequent mechanical separation referred to. Ordinarily, however, it is desirable to subject the carbonate of lime resulting from the reaction in the tank F to a treatment in the tank G and by which the excess of caustic lime and soluble impurities may be removed. This may be done by washing with an excess of water or by subjecting the carbonate to an additional treatment with a new quantity of alkali carbonate, by means of which the caustic lime will be converted into carbonate of lime, or by treatment with carbonic acid in aqueous solution or in gas form, or it may be converted into a more or less soluble solution of lime salt by treatment with a suitable acid, such as muriatic acid, sulfurous acid, or sulfuric acid. Hence it is preferable to remove the carbonate of lime from the tank F into the tank G and to add thereto a sufficient quantity of water to form a relatively thin milk of carbonate of lime, after which the suitable acid or acids are added. From the tank G the thin milk of carbonate of lime, together with its contained soluble and insoluble impurities, is passed through the filter-press H, by which the soluble impurities will be removed. The filter-cake obtained in the press is now dried in the drier I, after which it is passed through the grinding apparatus J, by which the dry cake will be ground or reduced to a fine powder. This dry fine powder is now passed through the bolting apparatus K, by which the fine amorphous particles of carbonate of lime will be separated from the coarser and heavier particles of the insoluble impurities contained therein. The fine dry amorphous carbonate of lime thus obtained may be sold in its powdered form, or it may be subjected to pressure and converted into bricks or into other forms. If desired, it may be mixed with water and sold as a paste, or a fluid may be obtained by adding an excess of water and which may form the basis of other pure lime salts, such as sulfate of lime and others, by treating the milk of carbonate of lime with a suitable powder. The pure carbonate of lime in amorphous finely-divided form which I obtain by the process above indicated may be used in place of precipitated chalk or as whiting, and for both of these uses it is commercially well adapted. At the same time it is obtained with the greatest economy of manufacture.

Having now described my invention, what I claim as new, and desire to secure by Letters Patent, is as follows:

1. In the manufacture of calcium carbonate from residues, the process for producing from calcium oxid and alkali carbonate a pure amorphous and extremely-divided calcium carbonate, which consists in causing the calcium oxid and alkali carbonate to react upon each other in the presence of water, in then separating the calcium carbonate formed by the reaction from the alkali hydrate and practically from all soluble impurities, including calcium hydrate, in drying the calcium carbonate, in reducing the dry calcium carbonate to powdered form, and in subjecting said dry powder to a mechanical separating action, substantially as set forth.

2. In the manufacture of calcium carbonate from residues, the process for producing from calcium oxid and alkali carbonate a pure amorphous and extremely-divided calcium carbonate, which consists in causing the calcium oxid and alkali carbonate to react upon each other in the presence of water, in then separating the calcium carbonate formed by the reaction from the alkali hydrate, and practically from all soluble impurities, including calcium hydrate, in drying the calcium carbonate, in reducing the dry calcium carbonate to powdered form, and in bolting said dry powder, substantially as set forth.

3. In the manufacture of calcium carbonate from residues, the process for producing from calcium oxid and alkali carbonate a pure amorphous and extremely-divided calcium carbonate, which consists in causing the calcium oxid and alkali carbonate to react upon each other in the presence of water, in then separating the calcium carbonate formed by the reaction from the alkali-hydrate solution, in mixing said calcium carbonate with water to dissolve the soluble impurities, including calcium hydrate, in passing the milk of calcium carbonate thus formed through a filter-press, thereby separating from the calcium carbonate the dissolved impurities, in drying the filter-cake, in grinding the dry cake, and in subjecting the powder thus obtained to a mechanical separating action, substantially as set forth.

4. In the manufacture of calcium carbonate from residues, the process for producing from calcium oxid and alkali carbonate a pure amorphous and extremely-divided calcium carbonate, which consists in causing the calcium oxid and alkali carbonate to react upon each other in the presence of water, in then separating the calcium carbonate formed by the reaction from the alkali-hydrate solution, in mixing said calcium carbonate with water to dissolve the soluble impurities, including calcium hydrate, in passing the milk of calcium carbonate thus formed through a filter-press, thereby separating from the calcium carbonate the dissolved impurities, in drying the filter-cake, in grinding the dry cake, and in bolting the fine powder thus obtained, substantially as set forth.

5. In the manufacture of calcium carbonate from residues, the process for producing from calcium oxid and alkali carbonate a pure amorphous and extremely-divided calcium carbonate, which consists in purifying the calcium oxid and alkali carbonate, in causing these materials to react upon each other in the presence of water, in then separating the calcium carbonate formed by the reaction from the alkali hydrate and practically from all soluble impurities, including calcium hydrate, in drying the calcium carbonate, in reducing the dry calcium carbonate to powdered form, and in subjecting said dry powder to a mechanical separating action, substantially as set forth.

6. In the manufacture of calcium carbonate from residues, the process for producing from calcium oxid and alkali carbonate a pure amorphous and extremely-divided calcium carbonate, which consists in purifying the calcium oxid and alkali carbonate, in causing these materials to react upon each other in the presence of water, in then separating the calcium carbonate formed by the reaction from the alkali hydrate and practically from all soluble impurities, including calcium hydrate, in drying the calcium carbonate, in reducing the dry calcium carbonate to powdered form, and in bolting said dry powder, substantially as set forth.

7. In the manufacture of calcium carbonate from residues, the process for producing from calcium oxid and alkali carbonate a pure amorphous and extremely-divided calcium carbonate, which consists in purifying the calcium oxid and alkali carbonate, in causing these materials to react upon each other in the presence of water, in then separating the calcium carbonate formed by the reaction from the alkali-hydrate solution, in mixing said calcium carbonate with water to dissolve the soluble impurities, including calcium hydrate, in passing the milk of calcium carbonate thus formed through a filter-press, thereby separating from the calcium carbonate the dissolved impurities, in drying the filter-cake, in grinding the dry cake, and in subjecting the powder thus obtained to a mechanical separating action, substantially as set forth.

8. In the manufacture of calcium carbonate from residues, the process for producing from calcium oxid and alkali carbonate a pure amorphous and extremely-divided calcium carbonate, which consists in purifying the calcium oxid and alkali carbonate, in causing these materials to react upon each other in the presence of water, in then separating the calcium carbonate formed by the reaction from the alkali-hydrate solution, in mixing said calcium carbonate with water to dissolve the soluble impurities, including calcium hydrate, in passing the milk of calcium carbonate thus formed through a filter-press, thereby separating from the calcium carbonate the dissolved impurities, in drying the filter-cake, in grinding the dry cake, and in bolting the fine powder thus obtained, substantially as set forth.

This specification signed and witnessed this 15th day of December, 1897.

HERMAN E. STURCKE.

Witnesses:
FRANK L. DYER,
EUGENE CONRAN.